(12) United States Patent
Silverman

(10) Patent No.: US 7,705,558 B2
(45) Date of Patent: Apr. 27, 2010

(54) IN SITU RECHARGEABLE BATTERY AND CHARGING STAND

(75) Inventor: Martin S. Silverman, Camarillo, CA (US)

(73) Assignee: Denovo Research, LLC, Camarillo, CA (US)

(*) Notice: Subject to any disclaimer, the term of this patent is extended or adjusted under 35 U.S.C. 154(b) by 1275 days.

(21) Appl. No.: 10/976,490

(22) Filed: Oct. 29, 2004

(65) Prior Publication Data

US 2005/0095498 A1    May 5, 2005

Related U.S. Application Data

(60) Provisional application No. 60/516,205, filed on Oct. 31, 2003.

(51) Int. Cl.
*H02J 7/00* (2006.01)
(52) U.S. Cl. ...................................................... 320/108
(58) Field of Classification Search .................. 320/108, 320/114, 115
See application file for complete search history.

(56) References Cited

U.S. PATENT DOCUMENTS

| | | | | |
|---|---|---|---|---|
| 4,379,988 A | * | 4/1983 | Mattatall | ..................... 320/108 |
| 4,587,182 A | | 5/1986 | Stiles et al. | |
| 5,276,393 A | * | 1/1994 | Gali | ........................... 320/101 |
| 5,300,875 A | | 4/1994 | Tuttle | |
| 5,644,207 A | * | 7/1997 | Lew et al. | .................... 320/101 |
| 5,749,909 A | | 5/1998 | Schroepel et al. | |
| 5,932,991 A | | 8/1999 | Ahuja et al. | |
| 6,310,960 B1 | | 10/2001 | Saaski et al. | |
| 6,358,645 B1 | | 3/2002 | Furukawa et al. | |
| 6,608,464 B1 | * | 8/2003 | Lew et al. | .................... 320/108 |
| 6,648,914 B2 | | 11/2003 | Berrang et al. | |
| 6,661,197 B2 | | 12/2003 | Zink et al. | |
| 6,707,274 B1 | | 3/2004 | Karr | |
| 2002/0113572 A1 | * | 8/2002 | Zink et al. | ................... 320/108 |
| 2003/0138693 A1 | | 7/2003 | Suzuki et al. | |

FOREIGN PATENT DOCUMENTS

EP   0909113 A2   4/1999
JP   63131472     3/1988

* cited by examiner

*Primary Examiner*—Bao Q Vu
*Assistant Examiner*—Jue Zhang
(74) *Attorney, Agent, or Firm*—Bruce A Jagger

(57) ABSTRACT

A secondary button cell battery that is particularly suited for use in hearing aid appliances, and an associated charging station. Recharging is accomplished without direct conductive connection between the source of the energy and either the battery or its appliance. Radio frequency energy is harvested in an enclosed chamber in a charging station and applied to the recharging of the button cell. Such energy is harvested by the use of one or more energy harvesting diodes connected in parallel with the battery. Multiple diodes connected in parallel or serial may be used to adjust charging current or voltage or both. Charge control is provided by directly or indirectly detecting the level of charge on the cell. Where the associated appliance is a hearing aid, the charge level detection may be accomplished acoustically by determining the characteristics of the sound emitted by the hearing aid, and charging is accomplished with the cell within the hearing aid appliance.

4 Claims, 4 Drawing Sheets

IN SITU RECHARGEABLE BATTERY AND CHARGING STAND

RELATED APPLICATIONS

This application claims the benefit of U.S. Provisional Application Ser. No. 60/516,205, filed Oct. 31, 2003.

BACKGROUND OF THE INVENTION

1. Field of the Invention

The invention relates in general to methods and devices for small secondary batteries and the recharging thereof, and in particular, rechargeable hearing aid batteries and recharging appliances therefor.

2. Description of the Prior Art

As is well known in the fields where small batteries are used to power electronic devices, and in particular in the hearing aid field, secondary batteries require periodic recharging and primary batteries require frequent replacement. Previous primary batteries typically lasted no more than, for example, approximately one week in hearing aid appliances. Such replacement of primary batteries requires physical manipulation of the small batteries. However, those hearing-impaired persons needing an aid are often afflicted with arthritis or other ailments and may have trouble manipulating the small rounded battery into the case. In addition, many hearing aid wearers and other users often forget to purchase batteries, or find it inconvenient to go out to obtain them. Primary batteries also represent an ongoing expense, and many hearing-impaired persons, for example, are required to live on a rather stringent budget.

The use of a rechargeable cell or battery in a hearing aid device is known, but such previous expedients suffered from several shortcomings, and have generally not solved the above-mentioned problems satisfactorily. Previous secondary hearing aid batteries lacked sufficient energy density and thus could not power the hearing aid for an adequate length of time. Such previous secondary batteries with short discharge cycles were generally unsatisfactory. Also, the expense of such secondary batteries was prohibitive for many users.

Two types of rechargeable hearing aids had been previously proposed. The direct plug-in type required the wearer to plug a charger directly into a socket on the hearing aid, to apply recharging current directly to the battery. The inductively rechargeable type of hearing aid was simply dropped, battery and all, into a recharger appliance, which produced an alternating current magnetic field. This oscillating field was converted by appropriate circuitry in the hearing aid itself, into a direct current that recharged the hearing aid battery. These types of rechargeable aids and associated charging stations, are specialized devices that can not be used with a standard unmodified hearing aid. A standard hearing aid cannot be plugged in or inductively charged with such previous expedients. It would be of great benefit if high energy density secondary batteries mounted in conventional unmodified hearing aids could be remotely recharged either by induction or by radio frequency (RF) energy, or the like. The provision of secondary batteries that include recharging electronics within the battery would further benefit the art. The utility of a secondary hearing aid battery with a conventional unmodified hearing aid could be greatly enhanced by the provision of a recharging station where no handling of the battery outside of the hearing aid is necessary.

These and other difficulties of the prior art have been overcome according to the present invention.

BRIEF SUMMARY OF THE INVENTION

The present invention has been developed in response to the current state of the art, and in particular, in response to these and other problems and needs that have not been fully or completely solved by currently available expedients. Thus, it is an overall object of the present invention to effectively resolve at least the problems and shortcomings identified herein. In particular, it is an object of the present invention to provide a small secondary battery, for example, a rechargeable hearing aid battery, with recharging electronics incorporated therein, which secondary battery can be used with a conventional unmodified appliance, for example, a hearing aid. It is also an object of the present invention to provide a charging station into which the entire unmodified appliance with the battery in place can be placed without further manipulation. It is a further object of the present invention to provide such a secondary battery and associated charging station wherein charging can be accomplished by radio frequency, inductive charging, transducer received charging, or the like, and without modifying the associated appliance. Embodiments of the present invention are particularly suitable for use with a conventional hearing aid.

To acquaint persons skilled in the pertinent arts most closely related to the present invention, a preferred embodiment of a secondary battery (a button cell) and associated charging station for a conventional unmodified hearing aid that illustrates the best mode now contemplated for putting the invention into practice is described herein by, and with reference to, the annexed drawings that form a part of the specification. The exemplary assembly is described in detail without attempting to show all of the various forms and modifications in which the invention might be embodied. As such, the embodiments shown and described herein are illustrative, and as will become apparent to those skilled in the arts, can be modified in numerous ways within the scope and spirit of the invention, the invention being measured by the appended claims and not by the details of the specification or drawings.

The present invention includes a small secondary button cell battery having a chemistry that is appropriate to the intended use, a case configuration that tends to resiliently compress the battery chemistry at all times during the discharge-recharge cycle, a flexibly configured separator, and a self contained recharging circuit. The structural elements of the button cell (case and separator) are all recoverably deformable to accommodate the volumetric changes that inherently occur during the discharge-recharge cycle of an electrochemical cell without suffering permanent deflection or distortion. In one preferred embodiment the recharging circuit can be, for example, one or more energy harvesting diodes. Charge control is provided by directly or indirectly detecting the level of charge on the battery and controlling the amount of applied charging energy in response to the detected charge level. A recharging station is also provided according to the present invention. The recharging station is adapted to recharging the battery while it is in operative association with an electronic appliance without electrically conductive contact between the recharging station and either the battery or the appliance in which it is mounted. Having all of the recharging circuitry in the battery itself provides significant cost, reliability, and convenience benefits. Once installed, a rechargeable battery according to the present invention, particularly a button battery, generally need not be removed from the associated appliance for the life of the rechargeable battery. Because the battery can be recharged numerous times, the battery need not be removed or handled for extended periods of time, for example, in a conventional hearing aid appliance. This is a significant improvement in convenience and cost over the present widely used non-rechargeable button battery that must be replaced about once a week. Additional convenience and safety are afforded by the present invention as against the use of previous expedients. For instance, in previous expedients the battery door of an appliance, for example, a hearing aid appliance, had to be opened when the hearing aid was not being worn. This was done to turn off the hearing aid. This conserved battery energy and silenced the acoustic feedback "squeal" that is typically emitted from a hearing aid when it is not being worn. Unfortunately, when the battery door was opened, the battery had a tendency to fall out of the appliance. Because of its small size and round wheel like shape, when the battery fell out it tended to roll. In many instances, the dropped battery was lost.

According to the present invention, these and other difficulties of previously proposed expedients are eliminated. According to the present invention the recharging station can be configured to automatically turn off the electronic appliance every time it is placed on the recharging station, or to utilize the "on" stage of the appliance as part of the charge control during the recharging phase of the discharge-recharge cycle. Generally, it is preferred to employ a recharging station that is conductively connected to the conventional house current that is generally available in the area. Portable battery powered recharging stations, however, have some utility. If the user wishes to turn off the appliance when a regular recharging station is not readily at hand, the appliance can be placed temporarily in a portable battery operated pocket sized recharger. By so doing, the appliance can be, for example, turned off and the battery can be "topped off" thus giving it an even longer period of use before it requires an extended recharging.

The long battery life cycle according to the present invention permits the provision of yet another option to a user who wishes to turn off the electronic appliance. A user can turn off the appliance by opening the battery door without risk that the battery will fall out of the appliance if an adhesive is employed to mount the battery in the battery compartment of the appliance. It is possible to adhesively secure the button battery in operative configuration with the appliance because the battery does not have to be replaced but approximately once a year.

A wide variety of secondary battery chemistries can be utilized, including, for example zinc/silver oxide, nickel/metal hydride, rechargeable lithium chemistries, nickel/cadmium, iron/nickel oxide, cadmium/silver oxide, zinc/nickel oxide, lead-acid, and the like. Many such systems and their characteristics are known to those skilled in the art. The present invention is not limited to any particular secondary battery chemistry. The battery chemistry can be tailored to the particular requirements of the associated appliance. Safe and environmentally friendly electro-chemical reactants can be employed if desired.

Other charging arrangements can be provided, for example, hearing aids have transducers for picking up sound. Acoustic energy can be harvested through the transducer to provide alternating current. The alternating current can be converted to direct current (rectified), and applied to charging the secondary battery.

The system can be switched on and off by many means, including, for example, a magnetic on/off switch.

Other objects, advantages, and novel features of the present invention will become more fully apparent from the following detailed description of the invention when considered in conjunction with the accompanying drawings, or may be learned by the practice of the invention as set forth herein.

BRIEF DESCRIPTION OF THE DRAWINGS

The present invention provides its benefits across a broad spectrum of secondary button cell battery technology. While the description which follows hereinafter is meant to be representative of a number of such applications, it is not exhaustive. As those skilled in the art will recognize, the basic apparatus taught herein can be readily adapted to many uses. This specification and the claims appended hereto should be accorded a breadth in keeping with the scope and spirit of the invention being disclosed despite what might appear to be limiting language imposed by the requirements of referring to the specific examples disclosed.

Referring particularly to the drawings for the purposes of illustrating the invention and its presently understood best mode only and not limitation.

DETAILED DESCRIPTION OF THE PREFERRED EMBODIMENTS

Figures 1, 2:
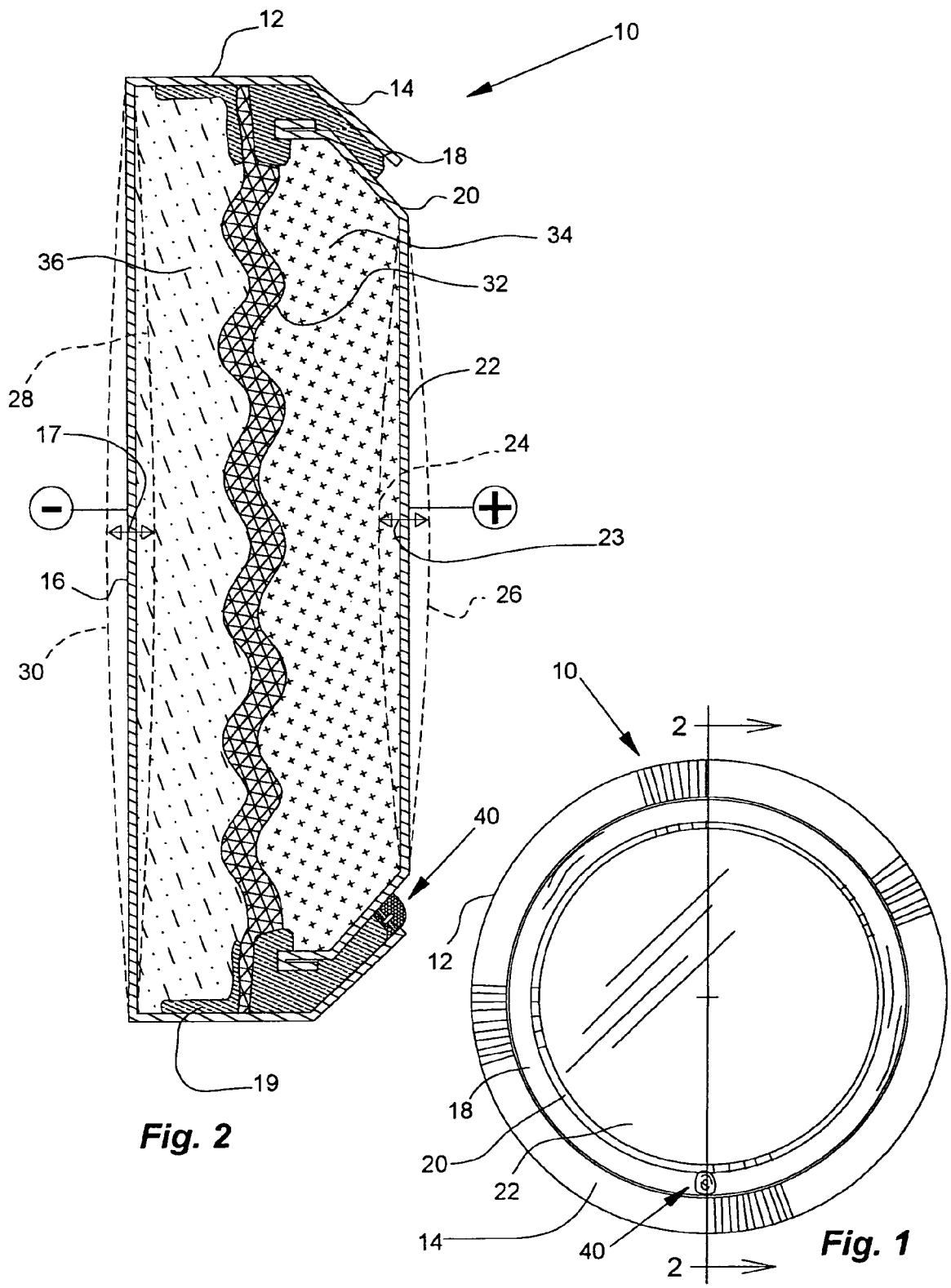
FIG. 1 is a plan view of one form of a button cell battery, which includes a radio frequency energy harvesting diode located in the gasket cleft and connected in parallel with the battery.
FIG. 2 is a cross-sectional view of the battery of FIG. 1 taken along section 2-2.

Referring now to the drawings wherein like reference numerals designate identical or corresponding parts throughout the several views. It is to be understood that the drawings are diagrammatic and schematic representations of various embodiments of the invention, and are not to be construed as limiting the invention in any way. The use of words and phrases herein with reference to specific embodiments is not intended to limit the meanings of such words and phrases to those specific embodiments. Words and phrases herein are intended to have their ordinary meanings, unless a specific definition is set forth at length herein.

Referring particularly to the drawings, there is illustrated generally at 10 a secondary battery having a button cell form wherein the chemistry is resiliently compressively enclosed within a resiliently deformable case and separated by a flexibly configured separator. Certain features are illustrated out of proportion for the purposes of illustration.

The resiliently deformable case (preferably, spring steel) is in two parts, the first of which encloses the cathodic side and acts as a cathodic terminal. The second part of the case encloses the anodic side of the battery and acts as an anodic terminal. The cathodic side of the case includes an annular side wall 12 integral with a generally circular plate 17 and a clamping rim 14. Clamping rim 14 is sealingly engaged with an annular dielectric gasket element 18. Element 18 serves to electrically insulated the anodic and cathodic battery case elements from one another, and to sealingly retain the battery chemistry within the case. The anodic side of the battery case includes a truncated conical section 20 integral with a circular pan 22. The larger end of conical section 20 is formed into an annular seal engaging rim for purposes of hermetically sealing with gasket 18. The generally annular space (gasket cleft) between the anodic and cathodic sides holds the gasket element 18.

A corrugated separator member 32 has a generally circular or disk form and separates the anodic and cathodic compartments of the battery 10 from one another, and serves the function of a conventional battery separator. The outer annular edge of separator 32 is sealed between case gasket 18 and inner seal 19. Separator 32 is preferably flexibly configured, for example, by corrugations, so as to flexibly accommodate the volumetric changes that are inherent in the battery chemistry during the discharge-recharge cycle of the battery. The material of the separator may or may not be elastic, however, as flexibility may be provided by the physical configuration of the separator.

The electro-chemical reactants that fill the anodic chamber of the battery 10 are indicated at 34, and those that fill the cathodic chamber are indicated at 36. Most electricity producing chemical reactions result in a physical change in the volume of the respective reactants. Since the reactants are typically packed tightly into the battery case, this change in volume causes the case to swell during, for example, the discharge phase of the discharge-recharge cycle. When the chemistry in such a system is recharged the volume of the electrochemical reactants shrinks. Conventional cases in prior primary button cells typically were constructed from soft steel that had very little resilience. The swelling of the typical soft steel case during discharge was, therefore, not significantly reversible. As the reactants shrank during attempted recharging, the prior soft steel cases on primary button cell batteries stayed distended or otherwise deformed. The volumetric change induced case deformation was largely permanent. Consequently, there was little or no pressure on the reactants as soon as any significant reduction in the volume of the reactants occurred. Electrical continuity within the battery was degraded the point where the battery became useless for its intended purpose. The migration of ions through the battery was also impaired.

The case elements, according to the present invention are composed of resiliently deformable material such as spring steel so that they deflect resiliently without permanent deformation as the chemical reactants swell and contract during the discharge-recharge cycle. This is illustrated in for example, FIG. 2. The nominal positions of the respective cathodic and anodic case elements are illustrated at 16 and 22. The cathodic case element 16 enjoys a resilient excursion distance between a concave and convex configuration illustrated at 17. The position of the case element on the cathodic side at the limit of the concave excursion is indicated at 28, and its position at the limit of the convex excursion is illustrated at 30. Likewise, the limits of the concave and convex excursion of the case element 22 on the anodic side of the case are illustrated at 24 and 26, respectively. The degree of these excursions is magnified in the drawings for the purposes of illustration. During discharge the typical secondary battery chemistry, for example, swells and the resilient case elements 16 and 22 move towards the convex configurations shown at 30 and 26, respectively. When the secondary battery is fully recharged, the chemistry shrinks and the springy case elements move towards the configuration shown at 28 and 24. As noted above, the battery separator 32 is corrugated so that it can flex to accommodate the above-described dimensional changes that accompany the recharge-discharge cycle. The separator thus remains intact from cycle to cycle. The magnitude of the corrugation is magnified in the drawings for purposes of illustration. By resiliently accommodating the inevitable dimensional changes that occur during the recharge-discharge cycle, the anodic and cathodic reactants within the cell remain tightly apposed to each other across the flexible battery separator at all stages of the cycle.

The case is not permanently deformed as a result of the inherent volumetric changes in the electrochemical reactants. By using resilient case walls the need for extra compression members in the battery to maintain the battery chemistry compressively confined in the case is avoided. The case can be composed of, for example, spring steel, beryllium-copper, metal loaded and other electrically conductive engineering plastics, or the like. The entire case need no be constructed of the same material. Various combinations of different resiliently deformable electrically conductive materials can be incorporated at different locations in the case. The resilient deformation need not be as indicated in FIG. 2, so long as the inherent volumetric changes in the reactants is resiliently accommodated without significant permanent deformation of the case walls. It is not generally necessary that the entire case be electrically conductive or resilient. The annular side wall can, for example, be composed of substantially rigid non-conductive material, if desired, provided the necessary conductive paths are provided for the negative and positive sides. A rigid conductive material such as a conductive ceramic could be used for the annular side wall, if desired. For the sake of efficient manufacturing, each case element is typically made from a single piece of material.

Figure 3:
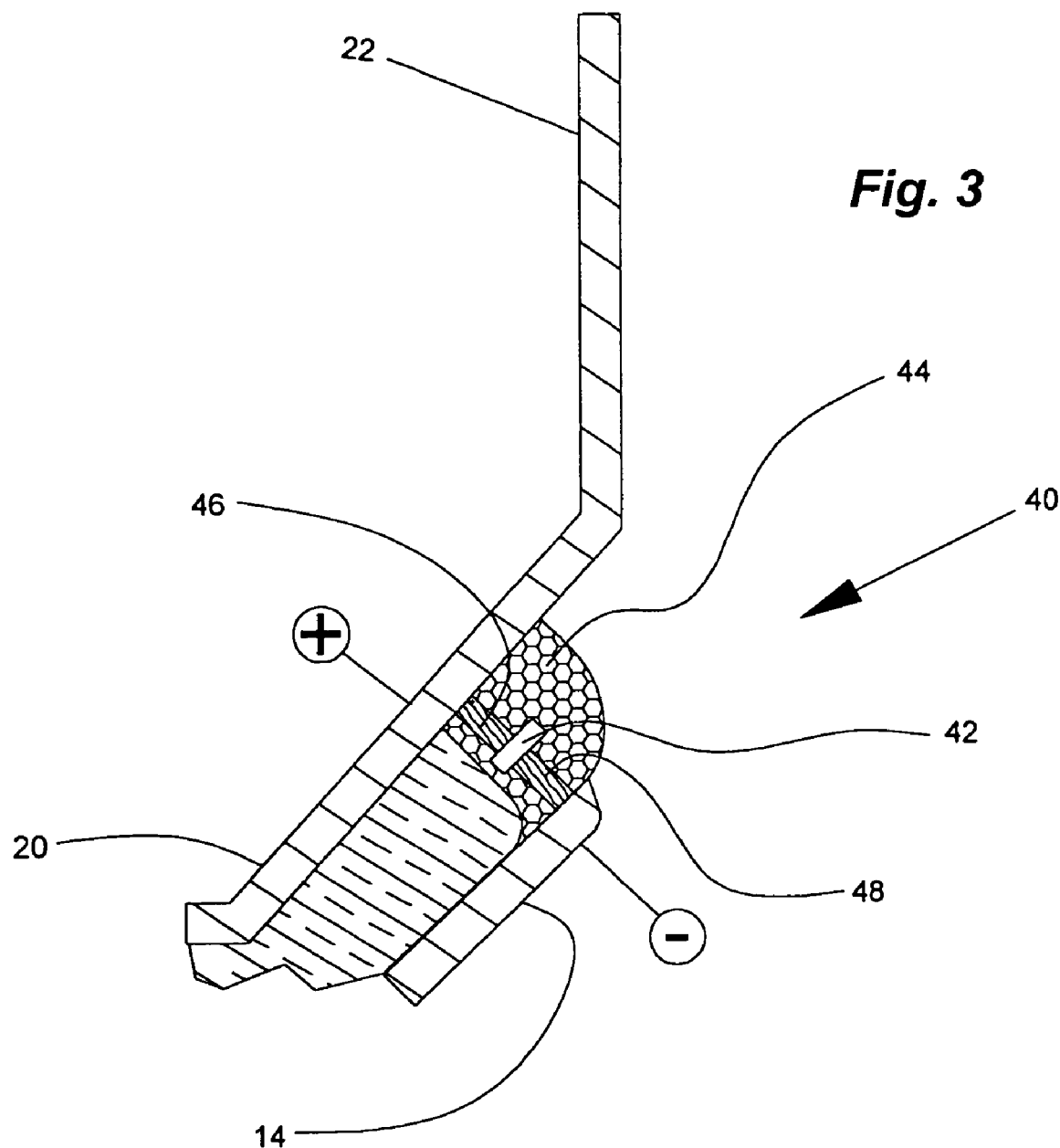
FIG. 3 is an enlarged cross-sectional view of the energy harvesting diode assembly of the embodiment of FIG. 1.

In a preferred embodiment, for example, a radio frequency (RF) energy harvesting diode is placed in parallel with the battery cell for recharging purposes. The diode harvests energy from radio frequency emissions. Preferably, the radio frequency emissions are generated under controlled conditions in a shielded charging station. Such a diode assembly is indicated generally at 40. The diode 42 (FIG. 3) is placed in the annular gasket cleft between the positive and negative case elements 20 and 14, respectively. The diode and associated circuitry can be placed in the gasket itself or at the outer edge of the gasket so long as it is not shielded from the charging energy. This unpackaged raw die is so small that it fits in the gasket cleft of a conventional button cell. Thus, a full standard sized button cell battery form can be used for the cell. Cells of a standard height and diameter can be used. This maximizes the amount of the electrochemical reactants within the cell. The standard battery compartment in the appliance need not be modified to accept cells configured according to the present invention. Standard production equipment and procedures can be used to make the cell, with only the added step of placing the diode assembly in the annular gasket cleft. Within the diode assembly 40, the diode 42 is encapsulated in, for example, a body of cured in situ epoxy 44. An electrically conductive path 46 is provided between the anodic side 20 of the battery case and the diode. Likewise, an electrically conductive path 48 is provided between the opposed side of the diode and the cathodic side 14 of the cell case. These electrically conductive paths can be composed, for example, of an electrically conductive formed and cured in situ plastic, small wires, traces, or the like. For purposes of illustration, only one diode assembly has been shown. As will be readily understood by those skilled in the art, a plurality of two or more RF energy harvesting diode assemblies can be used, if desired.

No special antenna is required for harvesting RF energy according to the present invention. The circuitry of an appliance such as, for example, a conventional hearing aid, and particularly the hearing aid audio transducer and its typically direct connection to the positive terminal of the battery cell, as well as the battery case itself, can be used as the antenna. No other antenna elements are absolutely required, although they can be used, if desired.

Figure 4:
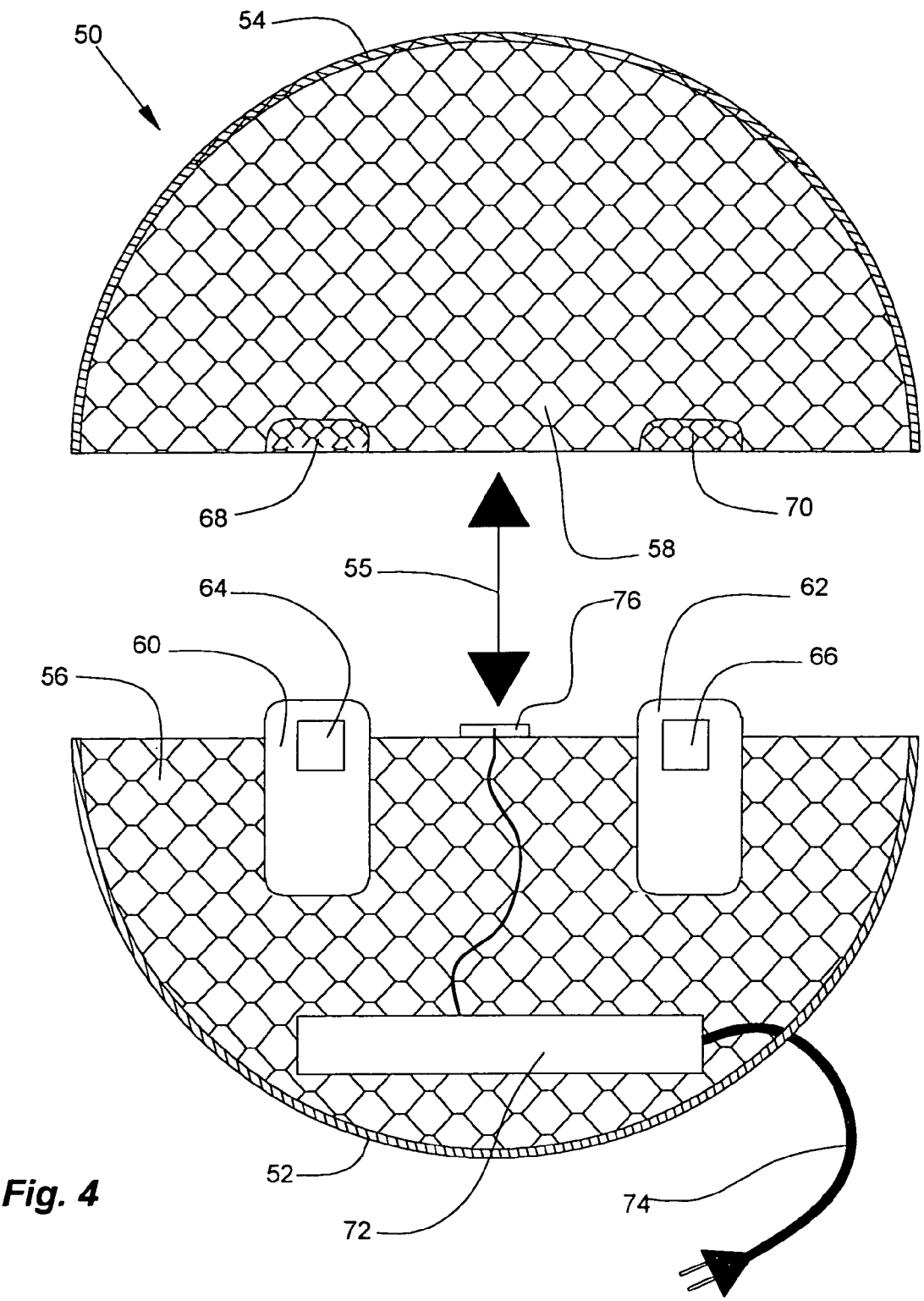
FIG. 4 is as a diagrammatic schematic cross-sectional view of a radio frequency transmitter recharging station adapted to recharging the button cell of the embodiment of FIG. 1.

With particular reference to FIG. 4, there is illustrated generally at 50 a charging station, the principal components of which are two mating metallic hemispheres 54 and 52, a radio frequency transmitter 72, and a microphone 76 that is operatively connected to transmitter 72. Hemispheres 52 and 54 are filled, for example, with reticulated foam beds 56 and 58, respectively, that are substantially transparent to RF energy. The foam beds 56 and 58 serve to receive and hold appliances 60 and 62 in recharging association with transmitter 72. Secondary batteries 66 and 64 are operatively mounted within appliances 62 and 60, respectively. Radio frequency transmitter 72 is connected to a source of energy by, for example, electrical cord 74. Hemispheres 52 and 54 are adapted to move as indicated at 55 between an open configuration shown in FIG. 4 and a fully closed configuration wherein the exposed ends of the rechargingly associated appliances (for example, hearing aids) 60 and 62 are received in foam pockets 68 and 70. Microphone 76 is positioned close to and approximately equidistant from the appliances, particularly hearing aids, to pick up sounds emitted by the hearing aids.

In its simplest form as applied to hearing aid appliances, the recharging station 50 consists of a platform onto which the hearing aids are placed. An energy source, for example, an RF transmitter is provided that emits RF energy of, for example, approximately 0.2 to 2 watts having a frequency of, for example, approximately 2.4 to 5.8 gigahertz (GHz). RF emissions can most effectively recharge the secondary cells when the platform is covered by an RF shield/dome reflector. In this way no RF energy escapes form the recharging station and further, the reflector focuses the RF energy onto the hearing aids. The RF transmitter 72 should also be fully shielded to protect any appliances such as radios, pace makers, and the like, from interference. Typically, a safety switch or interlock is provided (not shown) that prevents the RF transmitter from being activated unless the transmitter is fully shielded. Feedback control of the charging cycle can be efficiently designed into the recharging station 50, for example, by using acoustic signaling from the hearing aids 60 and 62 to indicate the level of charge on the batteries. This is accomplished by modulating the RF frequency with a low frequency signal and the use of an inexpensive microphone 76 situated near the hearing aids 60 and 62. The hearing aids 60 and 62 are left on during recharging so that they emit a sound. The characteristics of the tone change as the degree of charge in the cell changes. These changes in the characteristics of the tone emitted by the unmounted hearing aid can be employed to protect the battery from overcharging. A charge control member can thus control (between the maximum capacity of the RF transmitter, and completely off) the amount of radio frequency energy that is generated by the charging station responsive to the level of electrical charge on the secondary cell. The RF energy harvesting diode, see, for example, 42, and more particularly, it's relationship to the hearing aid battery may obviate the need to use additional regulating or switch means such as, for example, a zener diode, a MOSFET switch, or the like (not shown). The energy harvesting diode 42 is, for example, wired in parallel, see 46 and 48, with the battery, see, for example, 10 or 64. As will be understood by those skilled in the art, the use of a plurality of energy harvesting diodes in the gasket cleft permits their configuration into serial or parallel arrangements, or both, (not shown) to multiply the voltage or the current, or both. When the hearing aid is in the recharging station and is left "on" during recharging, the hearing aid itself bleeds off some of the charging current and converts it into an audible signal. As the battery voltage increases, more current is automatically consumed by the hearing aid circuit (generally according to ohms law). This circuit, in effect, acts as a "taper charger." When the battery is low (substantially discharged), less current is used by the hearing aid circuit, and as the battery becomes progressively more charged, the hearing aid progressively uses more of the current. As the hearing aid uses more current, it's acoustic emissions become louder which in turn are detected by the charging station through it's microphone pickup, for example, 76. When the battery is fully charged (it's charge acceptance decreases substantially) the amplitude of the acoustic emissions will increase more rapidly (the derivative of sound intensity over time). This can be used as the signal for the charge control member of the charging station to lower or discontinue the RF output. The use of acoustic signals to activate the charge control system is particularly useful when a single charging element, such as one or more energy harvesting diodes, is used. This allows for a very simple one active component charging system in the battery-appliance combination, with the complexity involved with charge control being located in the recharging station.

Energy harvesting diodes can also charge batteries from other energy sources, such as, for example, by acting as photovoltaic cells and harvesting photo energy. This requires that the diode be exposed to light of the appropriate wavelength, for example, ultraviolet, to activate the diode. The battery compartment must either be at least partly transparent to the light energy that is to be harvested, or the diode that is associated with the battery must be directly exposed to the light. When the control circuitry controllingly associated with RF transmitter 72 recognizes that the microphone 76 has detected a tone with certain predefined characteristics that are associated with a fully charged cell, the charge control circuitry shuts off the RF transmitter and, for example, turns on a signaling LED (not shown) indicating that the hearing aid battery is recharged.

Figure 5:
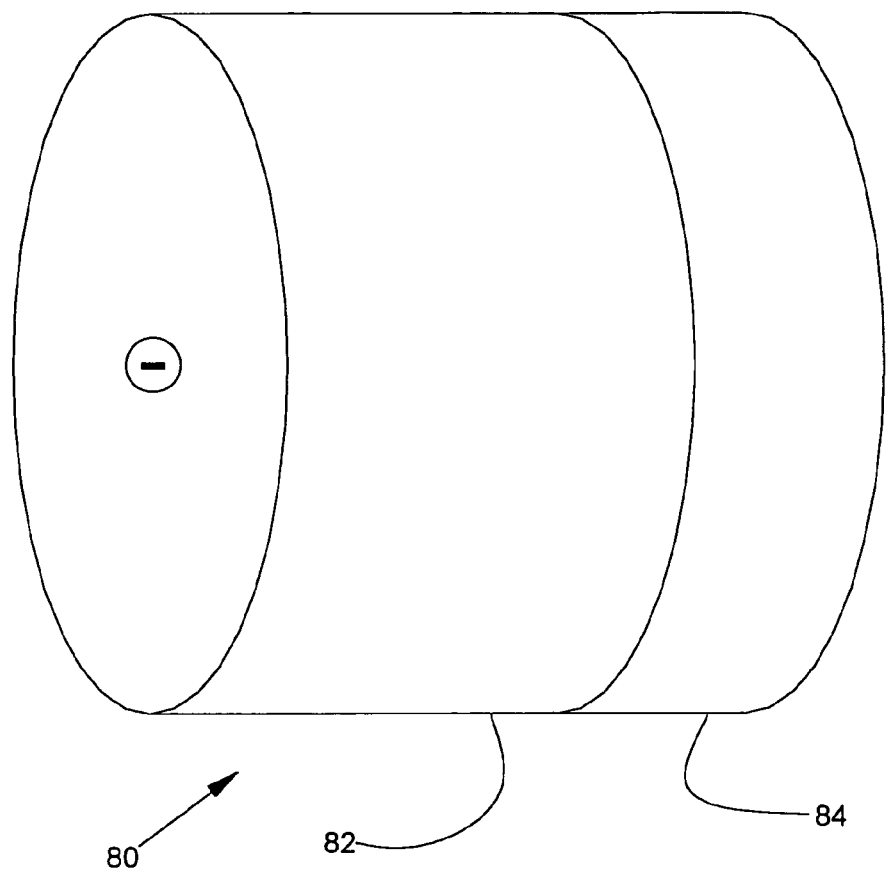
FIG. 5 is a diagrammatic and schematic representation of a button cell in which an in situ recharging circuit is mounted in an electronics compartment on the positive end of the cell.
Figure 6:
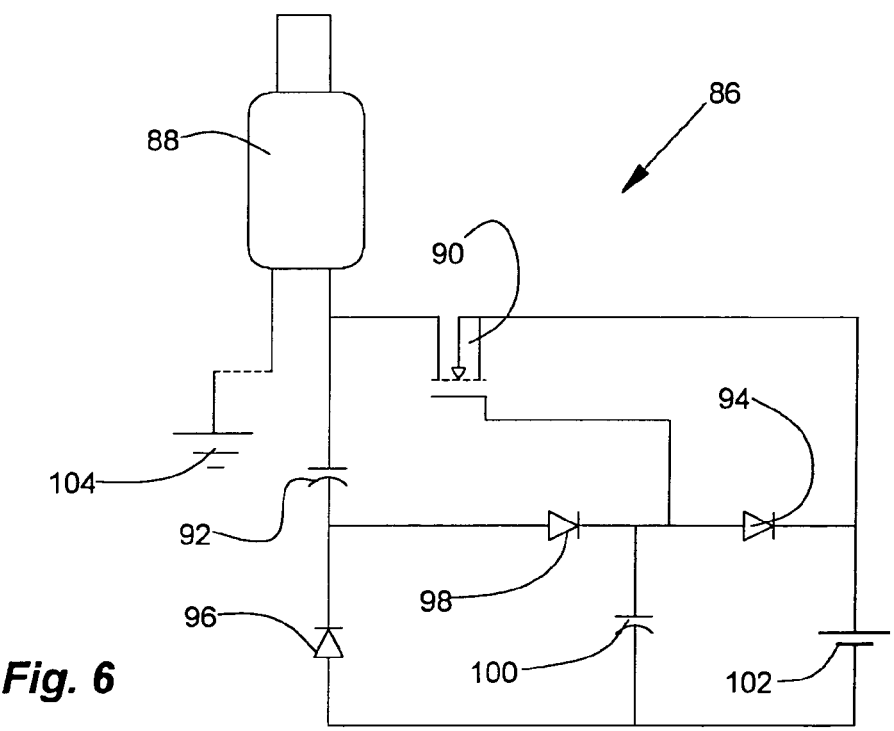
FIG. 6 is a diagrammatic representation of an in situ recharging circuit adapted for mounting in the electronics compartment on the positive end of the button cell of FIG. 5.

With particular reference to FIGS. 5 and 6, there is indicated generally at 80 a specially constructed secondary button cell battery in which the secondary battery chemistry is confined within section 82, and an in situ charging circuit is confined in a recharging section 84 on the positive side of the cell. A typical in situ recharging circuit that is suitable for use in compartment 84 is illustrated at 86. The in situ recharging circuit 86 is essentially composed of a voltage doubling rectifier circuit and P-channel depletion type mosfet with a low gate voltage and a low on resistance. All of these components are contained within the electronics compartment 84 of the battery. When exposed to radio frequency (RF) energy of the appropriate frequency and intensity, the hearing aid transducer inductive coil (contained within the hearing aid transducer 88) acts as an inductively loaded RF antenna and is in resonance with capacitor 92. The system is grounded at 104. The RF energy detector circuit (that is, the recharging circuit) composed of capacitors 92 and 100, and diodes 96 and 98 rectifies and doubles the RF voltage. The rectified current then flows into the battery 102 across diode 94, thus recharging the battery. In addition, the gate of the P-channel depletion type mosfet 90 is charged through 98 and thus turns off. By so doing, the hearing aid is automatically turned off, thus preserving energy while in the charging mode. When the RF recharging energy is turned off (for example, when the hearing aid is removed from the recharging stand) the mosfet gate is no longer charged through diode 98 and in addition, rectification by diode 94 disallows current from the battery to charge the mosfet gate. When the mosfet's gate is no longer charged, the mosfet 90 becomes conductive and thus turns the hearing aid back on.

Battery charge control can be achieved in several different ways in addition to the audio signaling described above. A zener diode controllingly associated with a circuit such as that illustrated in FIG. 6 can server to prevent overcharging of the cell. When a cell is fully recharged, sufficient current is released across a zener diode (not shown), which bypasses the mosfet and turns on the associated appliance. In an embodiment where an energy harvesting diode is present in a gasket cleft, the energy harvesting diode and zener diode can be positioned in series with the battery. When the charge on the cell reaches a predetermined level, the zener diode cuts of the supply of harvested energy to the cell. A radio frequency identification (RFID) transmitter can be associated with the cell, particularly in the battery compartment of an appliance, so as to transmit an indication of the level of the charge on the cell to the RF generator for appropriate predetermined response by the charge controlling member. An RFID tag can also be used as an energy harvester. The degree of the resilient deformation of the cell case walls can be monitored and used as a controlling indication of the level of charge on the secondary cell. A micro current OP AMP circuit can be employed to control charging. The charge control can sense or rely on the direct sensing of the level of charge on the cell, or it can indirectly sense or rely on the indirect sensing of the charge level for control purposes.

For purposes of convenience, a pocket sized cell charging station can be provided. For example, an energy harvesting diode-zener diode and mosfet off switch can be provided to allow a hearing aid to be turned off when exposed to an RF signal. The RF signal generator and charger can be easily incorporated into a pocket travel case to automatically turn off the hearing aid in the field. Also, such a traveling case for the appliance can include a magnetic switch activation element designed to cooperate with a magnetically actuated switch member in the appliance. Thus, for example, putting the appliance in the traveling case causes the magnetic field in the case to activate the switch in the appliance so as to turn the appliance off. Other switch members are conventionally available and well known to those skilled in the art.

Radio frequency generators of various designs and capacities are conventionally available, as is well known to those skilled in the art. For example, inexpensive tiny 2.4 and 5.8 gigahertz (GHz) single chip RF transmitters/receivers suitable for use as charging station electronics are conventionally available.

The dielectric gasket element is, for example, composed of conventional gasket material, or of specially designed material. Where energy harvesting diodes are employed, they can be embedded in the gasket during its manufacture together with the desired electrical conductors, or inserted into the gasket cleft after the gasket is in place, as desired.

A variety of energy harvesting diodes can be used, including those that are used for RF detection, such as 1N34A germanium diode.

What have been described are preferred embodiments in which modifications and changes may be made without departing from the spirit and scope of the accompanying claims. Many modifications and variations of the present invention are possible in light of the above teachings. It is therefore to be understood that, within the scope of the appended claims, the invention may be practiced otherwise than as specifically described.

What is claimed is:

1. A charging station for a secondary battery which said secondary battery has a radio frequency energy harvesting diode chargingly associated therewith, said charging station comprising:
    a charging chamber, said charging chamber having an open configuration and a closed configuration, said open configuration being adapted to the insertion and removal therefrom of said secondary battery in the form of a button cell including a radio frequency energy harvesting diode, said closed configuration being adapted to chargingly providing radio frequency energy at a frequency of from approximately 2.4 to 5.8 gigahertz to said radio frequency energy harvesting diode in said secondary battery, wherein said secondary battery is operatively associated with a hearing aid to form a battery-hearing aid combination, and said closed configuration being adapted to chargingly providing radio frequency energy to said battery-hearing aid combination, and said hearing aid being adapted to providing an indication of a level of electrical charge to a charge controlling member.

2. A charging station of claim 1 wherein said charging chamber in said closed configuration is adapted to substantially preventing the emission of said radio frequency energy from said charging chamber.

3. A charging station of claim 1 including a charge controlling member adapted to detecting the level of electrical charge on said secondary battery, and controlling the amount of said radio frequency energy generated by said charging station responsive to said detected level of electrical charge on said secondary battery.

4. A charging station for a secondary battery in the form of a button cell comprising:
    a charging chamber, said charging chamber having an open configuration and a closed configuration, said open configuration being adapted to the insertion and removal therefrom of said secondary battery, said closed configuration being adapted to chargingly providing radio frequency energy at a frequency of from approximately 2.4 to 5.8 gigahertz to said secondary battery, said secondary battery having a radio frequency energy harvesting diode chargingly associated therewith; and
    a charge controlling member adapted to controlling the amount of said radio frequency energy generated by said charging station responsive to a level of electrical charge on said secondary battery, wherein said secondary battery is operatively associated with a hearing aid to form a battery-hearing aid combination, and said closed configuration being adapted to chargingly providing radio frequency energy to said battery-hearing aid combination, and said hearing aid being adapted to providing an indication of said level of electrical charge to said charge controlling member.

* * * * *